United States Patent [19]

Dunn

[11] 4,417,633
[45] Nov. 29, 1983

[54] HYDRAULIC SYSTEM FOR PREVENTING LEAK DOWN OF HYDRAULIC IMPLEMENTS

[75] Inventor: Donnell L. Dunn, Terre Haute, Ind.

[73] Assignee: J. I. Case Company, Racine, Wis.

[21] Appl. No.: 245,092

[22] Filed: Mar. 18, 1981

[51] Int. Cl.³ .............................................. B62D 5/06
[52] U.S. Cl. ................................... 180/132; 180/152; 212/189; 280/764.1
[58] Field of Search ........................ 414/687, 694, 699; 212/182, 189; 91/514, 518, 517, 532; 180/132; 280/763–766

[56] References Cited

U.S. PATENT DOCUMENTS

| Re. 25,126 | 2/1962 | Charlson | 91/467 |
| 3,901,395 | 8/1975 | King | 414/694 |
| 4,043,419 | 8/1977 | Larson et al. | 180/132 |

Primary Examiner—Robert J. Spar
Assistant Examiner—Donald W. Underwood
Attorney, Agent, or Firm—Dressler, Goldsmith, Shore, Sutker & Milnamow, Ltd.

[57] ABSTRACT

A hydraulic system having a pump, a power steering valve, a loader control valve and a pressure compensating valve is used to supply fluid under pressure to one or more hydraulic actuators of an earthworking machine to prevent repositioning of those actuators due to hydraulic leakage or leak-down. The pressure compensating valve has two outlets. One outlet, the priority outlet, is joined to the power steering valve, the other outlet is joined to the loader control valve. The pressure compensating valve includes a load sensing line joined to the power steering valve. A hydraulic connection is provided between the priority output of the pressure compensating valve to those hydraulic actuators which are to be protected against leakdown. This connection includes a check valve to prevent reverse flow. Whenever the steering valve is actuated, the priority output from the pressure compensating valve is thus applied to those hydraulic actuators of interest. Thus, the driver of an earthworking machine on which the hydraulic system is installed is free to transport the machine over the open road without fear that one or more of its pivoted components will swing out of their transport position to some other undesired position due to leak-down.

1 Claim, 2 Drawing Figures

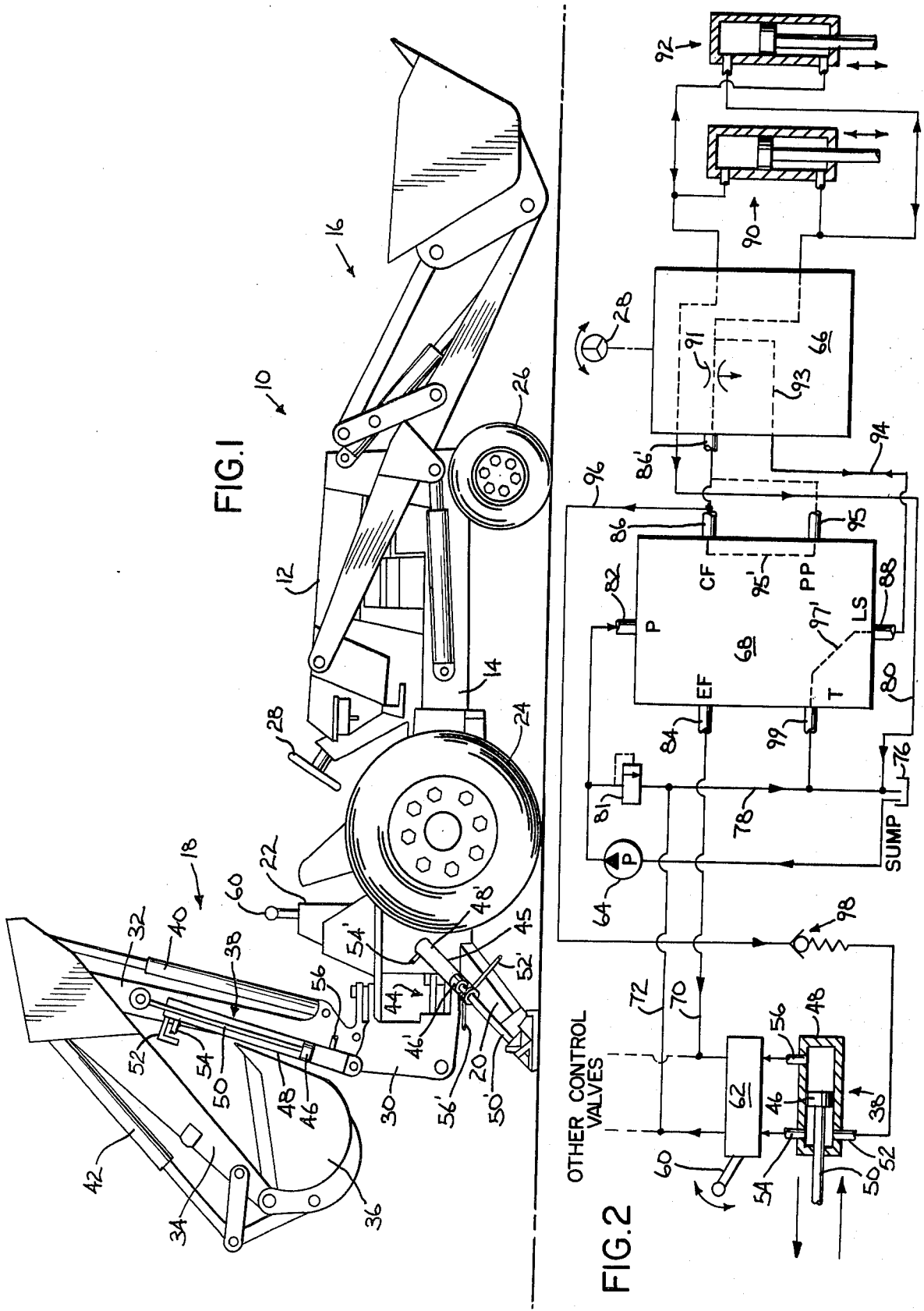

HYDRAULIC SYSTEM FOR PREVENTING LEAK DOWN OF HYDRAULIC IMPLEMENTS

TECHNICAL FIELD

This invention relates to a hydraulic system for an earthworking machine, such as a backhoe. More particularly, it relates to a hydraulic system where the output of the system's hydraulic pump in conjunction with a pressure compensating valve is used to supply hydraulic fluid to a power steering valve and a control valve which operates an hydraulically actuated arm.

BACKGROUND OF THE INVENTION

A representative item or machine used in or by the construction industry is a backhoe. Backhoes normally consist of a boom that is pivoted on the frame of a tractor by a fluid ram or a hydraulic motor and an earthworking tool or bucket assembly that is pivoted on the free end of the boom by a second or another hydraulic motor. During transportation or storage, the boom and equipment attached thereto are positioned so as to occupy the least floor space. This makes movement on public roads and highways more convenient and safe since the center of gravity of the implement or backhoe is shifted closer to the wheels of the tractor. It also limits the backhoe tail swing which is of special concern when moving the backhoe over rough or uneven terrain.

A so-called "transport position" is generally disclosed by Long U.S. Pat. No. 3,376,984 which is assigned to the assignee of the present invention. In that patent, the boom is swung to a transport position that is generally vertical and slightly forward of the vertical axis extending through the boom and its support. That boom was held locked in the transport position by the boom fluid ram which had passed through its "over-center" position. While that arrangement is acceptable, there are times when because of age or excess wear, the hydraulic motor or fluid ram positioning the boom leaks to such an extent that the boom eventually slumps downwardly, particularly when the machine is moved over rough or uneven terrain. This is often referred to as "leak-down".

One method of positively interlocking the boom and its support without relying on fluid in the rams operating the boom is disclosed in Schumaker U.S. Pat. No. 3,811,582 (which is also assigned to the assignee of the present invention). While that method or scheme is satisfactory, it is particularly applicable to earth-working implements of a specific type (e.g., those with a fluid ram actuating a tool having a member pivoted intermediate its ends). It does not address ordinary hydraulically actuated pivoting arms and members such as a stabilizer assembly.

Thus, when it is necessary to move the machine over a relatively short distance or if the machine does not employ a positive mechanical interlock between the boom and the boom support, it would be desirable to have a hydraulic system which can make-up for whatever leakage is occurring at the hydraulic motor and thus prevent the boom or similar pivoted arm from slumping or slowly falling from an upright position.

This same problem is equally applicable to the hydraulic motors or actuators used to operate the stabilizer assemblies or outriggers. When the machine to which the stabilizers are attached is moved from one location to another, these stabilizer assemblies are normally raised or tucked inwardly so as to be clear of the ground. Some machines incorporate a mechanical lock to insure that the stabilizer assembly remains in its upright or raised position even if hydraulic fluid was lost from the hydraulic motor. It is particularly desirable to have something to solve this problem which is very low in cost and which incorporates equipment and systems already existing in the machine. Thus, if pre-existing equipment and systems can be made to serve a dual function, the utility of the overall system is enhanced at a relatively low cost.

The hydraulic system art is already aware of various arrangements for hydraulic pumps and valves for use in tractors or the like having hydraulic or power steering and hydraulic or power brakes and one or more valves for controlling the position of an implement such as a bucket. U.S. Pat. Nos. 4,010,610 and 4,005,636 by the present inventor describe two arrangements.

One device which has found particular usefulness in hydraulic systems used by backhoes, loaders and the like is a pressure compensating valve. These valves are often used so that a control valve or component in the system always has a constant pressure drop cross it to achieve smooth and precise hydraulic operation. The pressure compensating valve is hydraulically connected to a fixed displacement hydraulic pump. A biasing member together with a hydraulic line filled with fluid representative of the hydraulic load pressure is often used to establish a constant hydraulic pressure drop across the component or control valve supplying fluid to the load monitored by the pressure compensating valve.

Many hydraulic systems used in earth-working machines such as backhoes and the like incorporate a pressure compensating valve in conjunction with a power steering valve. The pressure compensating valve in these systems are often referred to as an "unloading valve." The pressure compensation valve smooths the operation and response of the power steering mechanism. Whenever the machine or tractor is turned, the pressure compensating valve senses and responds to the change in return hydraulic pressure due to the operation of the power steering valve. The result is that the power steering valve always has a constant pressure drop across it. Since the pressure drop across the power steering valve is constant, the rate at which the steering hydraulic motors move or travel is a function only of the rate at which the steering wheel itself is turned; therefore, the load on the system has no effect on the operation of the power steering mechanism (at least up to the limit of the pressure relief valve which may be employed with the system).

Since the power steering mechanism is so common to material handling machines, it would be desirable to use that system to the fullest and to maximize its utility, particularly with regard to the lead-down problem previously described. It would be especially desirable if the problem could be solved in such a manner that it could be applied to existing equipment without extensive modification or cost.

SUMMARY OF THE INVENTION

According to the present invention, a hydraulic system incorporating a power steering valve and a control valve for a hydraulic motor or cylinder together with a pressure compensating or unloading valve is provided that supplies hydraulic fluid under pressure to prevent one or more associated hydraulic cylinders from changing position as a result of leakage. The hydraulic cylinders of interest are those connected to a pivoting arm which, in the absence of hydraulic pressure applied to one side of the piston in the hydraulic cylinder, would slowly pivot or slump downwardly (i.e., leak-down) by virtue of its own weight. By directing a supply of hydraulic fluid to that side of the piston, which if leaking would allow the boom or arm to slump, uncontrolled movement of a boom or arm is prevented particularly when the tractor is moved on the open road or over rough and uneven terrain.

The hydraulic system in one embodiment incorporates: a hydraulic pump; a pressure compensating valve having a hydraulic inlet, two hydraulic outlets, a hydraulic load sensing line, and a pressure pilot line; a power steering valve which is connected to one of the outlets of the pressure compensating valve and which defines a flow orifice across which the other end of the load sensing line and the pressure pilot line are connected; and a loader control valve connected with the other outlet on the pressure compensating valve. Finally, a special hydraulic connection or conduit incorporating a check valve is used to join one side of the piston in the hydraulic cylinder of interest with that outlet of the pressure compensating valve joined to the power steering valve. Thus, whenever the power steering valve is repositioned, as when the tractor is moved over the open road, the pressure compensating valve produces a flow of fluid to the hydraulic cylinder of interest. Normally, when the power steering valve is not being operated, the pressure in the line between the outlet of the pressure compensating valve and the power steering valve is at a low standby pressure. However, when the power steering valve is operated, the pressure rises to a valve equal to or greater than that necessary to steer the machine. If because of leakage from that hydraulic cylinder the boom or arm to which it is attached tends to slump or move downwardly through the force of gravity, the pressure compensating valve supplies sufficient fluid under pressure to make-up for this leakage and thus prevent leak-down of the associated hydraulically actuated arm.

Since the hydraulic system uses components which are already provided as a matter of course to operate the major components of the tractor, those components take on added utility of usefulness in that they now serve two purposes or functions. This added benefit is achieved as the result of a nominal increase in the overall cost of the machine. Numerous other advantages and features of the present invention will become readily apparent from the following detailed description of the invention, from the embodiment illustrated therein, from the claims, and from the accompanying drawings.

BRIEF DESCRIPTION OF THE DRAWINGS

FIG. 1 is a right, side, elevational view of a tractor loader incorporating a backhoe at its rear end and the hydraulic system that is the subject of the present invention; and FIG. 2 is a schematic diagram illustrating the manner in which the major components of the hydraulic system used in the machine shown in FIG. 1 are hydraulically joined together.

DETAILED DESCRIPTION

While this invention is susceptible of embodiment in many different forms, there is shown in the drawings and will herein be described in detail one embodiment with the understanding that the present disclosure is to be considered as an exemplification of the principles of the invention and is not intended to limit the invention to the particular embodiment illustrated.

FIG. 1 of the drawing shows a machine 10 that is commonly referred to as a tractor loader or backhoe loader. Specifically, a tractor 12 provides a base or frame 14 for mounting a loader 16 at the front end of the tractor and for mounting a backhoe implement 18 at the rear end of the tractor. A pair of stabilizer assemblies or outriggers 20 (only one being shown) are provided at the rear end of the tractor 12. The outriggers are joined to the frame 14 of the tractor 12. The backhoe implement 18 includes an operator's station 22 which may be part of the tractor or a separate area of the main frame or base of the backhoe. The tractor 12 is supported by a set of rear driving wheels 24 and a pair of pivoting front wheels 26. A conventional steering wheel 28 is used to pivot the front wheels 26 to change direction of travel of the tractor.

The construction of the backhoe 18 is conventional. The backhoe includes a swing tower or boom support 30 to rotate the boom 32 about a vertical axis. A dipper stick 34 is supported on the other end of the boom 32. The dipper stick 34 is pivoted on the boom at a point intermediate its ends. At the opposite end of the dipper stick 34, a bucket 36 is pivotally attached. A hydraulic motor or fluid ram 38, pivoted at one end to the swing tower 30 and pivoted at the other end to the boom 32, rotates the boom about a horizontal axis relative to the swing tower. Another hydraulic motor 40 is pivotally connected at one end to the boom 32 and at its opposite end to the dipper stick 34. This hydraulic motor 40 pivots the dipper stick 34 about a horizontal axis relative to the boom 32. Another hydraulic motor 42, pivotally connected between the bucket 36 and the dipper stick 34, pivots the bucket relative to the dipper stick. A pair of hydraulic motors 44, pivotally connected between the frame 14 of the tractor 12 and the swing tower 30, are used to pivot the swing tower about its verticl axis. Finally, another hydraulic motor 45, pivotally connected between the frame 14 of the tractor 12 and the free end of the stabilizer assembly 20, is used to rotate each stabilizer assembly from an upright or transport position to an extended or support position.

Referring to the hydraulic motor 45 used to raise and lower the outrigger 20, it should be clear from the figures that the outrigger 20 is raised by pressurizing the piston rod side of the piston 46' by supplying hydraulic fluid through a port or connection 52' on the lower end of the cylinder. The application of pressurized fluid at this port 52' coincident with the simultaneous removal of fluid from a port 54' on the opposite side or head side of the piston 46' will force the outrigger 20 upwardly. Similarly, once the outrigger is raised, the pressurization of the head side of the piston 46' coincident with the simultaneous withdrawal of fluid from the piston rod side of the piston will drive the outrigger 20 from its raised position to its extended position. Thus, it should be appreciated that if the fluid is allowed to leak from the piston rod side of the piston when the outrigger 20 is in its raised position, eventually the outrigger will slump or fall back downwardly from its raised position to its extended position. This phenomena is referred to as "lead-down."

The hydraulic motor 38 used to pivot the boom 32 relative to the swing tower 30 functions essentially as the hydraulic motor 45 used to operate the outrigger 20. Certain backhoes of an advanced design (in particular, those described by Long U.S. Pat. No. 3,376,984) mount the boom 32 and the motor 38 used to position the boom such that the boom can be raised and moved through or past a vertical or upright position to a forwardly disposed position. The boom 32 as illustrated in FIG. 1 is in this forwardly disposed position. This position is the so-called "transport position." In moving to this position, the hydraulic motor 38 is driven through its "over-center" position. In other words, the hydraulic motor 38 in moving the boom 32 to the transport position moves in such a manner that, after the boom passes through its approximately vertical position, its piston rod 50, after having been driven to its farthest position inwardly, moves outwardly until forward travel of the boom is stopped by the swing tower 30. Thus, if leakage occurs on the piston rod side of the piston 46, the boom 32 will have a tendency to slip rearwardly and downwardly. Therefore, if the boom 32 is to be retained in the transport position, it is necessary to maintain pressurized fluid on the piston rod side of the piston 46. This is just the opposite of what must be done to maintain the outrigger 20 in its upright or folded position.

From the foregoing it should be clear that when the tractor 12 is moved over the open road, leakdown of a hydraulically actuated boom 32 or outrigger 20 can be prevented by supplying fluid under pressure to that side of the cylinder which, if it leaked, would allow the boom or arm to move to the undesired position. The hydraulic system that is the subject of the present invention supplies fluid to an auxiliary port 52 joined to the cylinder of the hydraulic actuator, the undesired movement of which is to be protected against. This port of course, is not a separated port from those two ports 54 and 56 normally provided to stroke the hydraulic actuator. For the purpose of clarity and explanation this auxiliary port 52 is shown as a separate port.

Referring to FIG. 2 a schematic diagram is presented of the hydraulic system used to operate the mechanical components illustrated in FIG. 1. Specifically, that hydraulic motor 38 used to operate the backhoe boom 32 is shown along with its associated hydraulic connections. The hydraulic motor 38 is operated by a control valve 62 whose position is changed by an operating lever or stick 60. The tractor driver or backhoe equipment operator, by changing the position of the operating lever 60, controls or directs hydraulic fluid to one side or the other of the piston 46 in the hydraulic motor 38.

The major components of the hydraulic system illustrated in FIG. 2 include a hydraulic pump 64 providing a source of pressurized hydraulic fluid, a power steering valve 66, a control valve 62, and a pressure compensating valve 68. Although one control valve 62 and one hydraulic motor 38 operated by that control valve are illustrated, it should be understood that the lines 70 and 72 supplying fluid to and from the control valve can be fluidly connected to other control valves to operate the other hydraulic motors and fluid rams used in tractor loader shown in FIG. 1. The pump 64 takes a suction or draws fluid from a hydraulic sump 76. The fluid displaced by the operation of power steering valve 66 and the hydraulic control valve 62 is directed to the sump 76 by return lines 78 and 80. A relief valve 81 directs fluid discharged from the pump 64 to the sump 76 in the event that the pump outlet pressure becomes excessive. As such, the components illustrated in FIG. 2 are familiar to those skilled in the art.

The output from the pump 64 is directed to a pressure compensating valve 68 which distributes hydraulic fluid to the power steering valve 66 and the control valve 62. Larson et al. (U.S. Pat. No. 4,043,419) describes in detail several hydraulic load sensing systems incorporating a pilot-operated flow control or priority valve (see FIG. 8 of LARSON, in particular) together with a power steering valve. A similar and slightly more complex system is described by the present inventor in U.S. Pat. No. 4,061,201. There a hydraulic load sensing system is described incorporating a pressure compensating valve together with a hydraulic steering valve, a hydraulic brake valve, and two hydraulic pumps. Insofar as the description of these individual components is concerned, those patents are hereby incorporated by reference.

The pressure compensating valve 68 typically employs a spool of the open center type. As illustrated in FIG. 2 the pressure compensating valve has an inlet port 82, two outlet ports 84 and 86, and one pilot or load sensing port 88. (LARSON FIG. 8, line 57). The pressure compensating valve 68 usually houses an internal relief valve (LARSON FIG. 8, line 59) whose inlet is joined by an internal passageway 97' to the load sensing port 88 and whose outlet is directed from a fitting 99 on the valve body to the sump 76. If the pressure compensating valve 68 is located fairly distant from the power steering valve 66, an additional pilot line 95 is used to communicate the pressure at the inlet 86' of the power steering valve (LARSON FIG. 8, line 67). If they are fairly close, an internal passageway 95' in the pressure compensating valve 68 can be used to communicate the pressure of the fluid flowing to the power steering valve 66. The pressure compensating valve 68 senses the load pressure at the power steering valve 66 and sets or regulates the output pressure of the pump 64 at approximately 100 psi above that load pressure. As such the pressure compensating valve 68 has a single hydraulic inlet 82 and two hydraulic outlet ports 84 and 86 which are connected to the control valve 62 and the power steering valve 66 respectively. For convenience, that outlet 86 of the pressure compensating valve 68 joined to the power steering valve 66 will be referred to as the "steering outlet port." Similarly, that outlet port 84 joined to the inlet of the hydraulic control valve 62 will be referred to as the "loader outlet port."

The power steering valve 66 is of conventional design. Typically, the valve is a three-position spool valve whose spool is of the closed center type. Charlson U.S. Pat. No. Re. 25,126 describes such a valve in detail; for purposes of description that patent is herein incorporated by reference. Thus, when the spool is in its neutral or center position the fluid flowing out of the steering outlet port 86 is "dead headed." However, if the tractor steering wheel 28 is moved, the spool within the power steering valve 66 changes position. Referring to FIG. 2, a flow path is formed within the power steering valve 66 which directs fluid from the pressure compensating valve 68 to the two hydraulic motors 90 and 92 used to pivot the front wheels 26 of the tractor 12. When the spool is out of the center position, a portion of the hydraulic fluid driving the two hydraulic motors 90 and 92 is directed to the pilot sensing port 88 via an internal metering passageway 93 located downstream of variable orifice 91 (See LARSON FIG. 1, element 35). Since one pilot line or port 95 is located upstream of the variable orifice 91 and the line 94 (which is joined to the load sensing port 88) receives fluid from the downstream of the variable orifice 91, opposing pressure signals are provided which accurately represent the pressure drop across the variable orifice and the "hydraulic load" resulting from manipulating the steering wheel 28. As was previously explained, the pressure compensating valve 68 spool is positioned by these two pressure signals to maintain a constant pressure drop across the hydraulic motors 90 and 92. Thus, when one or both of the hydraulic motors 90 and 92 are pressurized by the power steering valve 66, the pressure compensating valve 68 senses that demand through the line 94 joined to the load sensing port 88.

Subsequently, when the power steering valve 66 is not pressurized (i.e. returned to center or neutral position), the pilot sensing line 94 is lined-up to the sump 76 via the return line 80. Since the pressure applied to the pressure compensating valve 68 via the pilot sensing line 94 is then low, the internal spool within the pressure compensating valve 68 directs all of the flow through the loader outlet port 84. Since the loader outlet port 84 is joined to the control valve 62 via a hydraulic line 70, substantially all of the flow from the hydraulic pump 64 is directed to the control valve 62.

The hydraulic control valve 62 is typically a three-position spool valve of the "open-center" type. When the spool is in its center position, hydraulic fluid flows through the valve and to the return lines 72 and 78 going to the sump 76. If the control or operating lever 60 is moved, the spool within the valve moves upwardly or downwardly away from its center position. This in turn pressurizes the associated hydraulic motor 38. Fluid enters one side of the piston 46 and is displaced or flows out of the other side of the piston. Additional details concerning the hydraulic control valve 62 are found in Dunn U.S. Pat. No. 4,061,201 which, for purposes of description, is incorporated herein by reference.

As explained above, when the load sensing line 94 in the pressure compensating valve 68 is pressurized (i.e. the power steering valve 66 is out of its center position), the spool within that valve repositions to direct substantially all of the flow from the pump 64 to the power steering valve 66. Conversely, when the power steering valve 66 is not pressurized (i.e., it is in its center position), the spool within the pressure compensating valve 68 repositions such that substantially all of the fluid leaving the pump 64 is directed to the hydraulic control valve 62 via the loader outlet port 84 and supply line 70.

In order to use the variable flow out of the pressure compensating valve 68 to prevent leakdown, the steering outlet port 86 is also joined to a line 96 having a check valve 98 that is joined, at its other end, to the piston rod side of the hydraulic motor 45 via an inlet port 52. Thus, when the hydraulic motors 90 or 92 are moved in response to the power steering valve 66, the steering outlet port 86 receives pressurized fluid from the hydraulic pump 64. This, in turn, pressurizes the line 96 joined to the hydraulic motor 38 operated by the control valve 62. If the pressure in this line 96 is greater than the spring holding the check valve 98 shut, fluid will be supplied from the pressure compensating valve 68 to the hydraulic motor 38. If, by some chance, there is sufficient leakage on the head side of the piston 46, then the flow of fluid from the pressure compensating valve 68 through the interconnecting line 96 will supply sufficient pressurized fluid to counteract the tendency (i.e., leak-down) of the piston rod 50 to move inwardly toward the head side of the hydraulic motor 38.

The check valve 98 is used to prevent reverse flow. When the head side of the hydraulic motor 38 is pressurized via the inlet port 56 joined to the hydraulic control valve 62 the check valve 98 seats. This prevents fluid from flowing out of the hydraulic control valve 62 and back into the pressure compensating valve 68.

Thus, from the foregoing description and the appended drawings, it should be evident that the present invention provides an improved hydraulic system not only supplying hydraulic fluid under pressure to operate the steering and loader valves, but also supplying fluid to those hydraulic motors which if leakage became excessive, would slump or reposition to an undesired configuration. Although the hydraulic system illustrated in FIG. 2 is shown connected to the hydraulic actuator 38 used to operate the boom 32, this same system could be used to actuate one or more of the other actuators. Similarly, although only one hydraulic motor was shown joined to the loader outlet port 84 on the pressure compensating valve, it should be readily apparent that more than one hydraulic motor could be connected. Accordingly, various hydraulic systems and arrangements may be employed using the features of the present invention. All such modifications and variations are to be included within the scope of the appended claims.

What is claimed is as follows:

1. A hydraulic power steering system for selectively effecting actuation of a steering motor to pivot one or more of the wheels supporting a tractor and for actuating at least one hydraulic motor carried by the frame of the tractor and having a piston, a cylinder, and a piston rod, said hydraulic motor being pivoted between the frame of said tractor and the free end of an arm pivoted at one of its ends to the tractor frame so that when actuated said hydraulic motor pivots said arm between raised and lowered positions, said system being adapted to pressurize said one hydraulic motor during transport of said tractor attendant to actuation of said steering motor and, comprising:

(a) a source of pressurized fluid for operating the steering motor and the hydraulic motor;

(b) a closed-center steering control valve having a center-neutral position, disposed in series flow relationship between said source of pressurized fluid and the steering motor, defining a variable orifice operable to establish a fluid flow rate from said steering control valve to the steering motor;

(c) selectively operable control valve means, disposed in series flow relationship between said source of pressurized fluid and said hydraulic motor, for operating said hydraulic motor; to pivot said arm between said raised and lowered positions (d) pressure compensating valve means, disposed in series flow relationship between said source of pressurized fluid and said control valve means and said steering control valve respectively, for controlling the flow of fluid from said source to said steering control valve and said control valve means to maintain a generally constant pressure drop across said variable orifice, said pressure compensating valve means, including an inlet port in fluid communication with said source of pressurized fluid, a controlled flow steering outlet port in direct fluid communication with the inlet of said variable orifice on said steering control valve, an excess flow loader outlet port in fluid communication with the inlet of said control valve means through which pressurized fluid is supplied for operating said hydraulic motor, and a load sensing port in fluid communication with the outlet of said variable orifice of said steering control valve; and (e) an additional hydraulic connection line bypassing said control valve means, said additional hydraulic line interconnecting said steering outlet port on said pressure compensating valve with a flow port on said cylinder on that one side of the piston in said cylinder which if leaked would pivot said arm away from its raised position, said additional hydraulic line directing hydraulic fluid flow from said pressure compensating valve to said hydraulic motor to replenish leakage from said one side of said piston whenever said steering control valve is operated to produce flow through said first variable orifice, thereby preventing said piston rod from repositioning due to leaking during transport of said tractor to maintain said arm in raised position, said additional hydraulic line including a one-way flow check valve to prevent reverse fluid flow in said additional hydraulic line from said motor directly to said pressure compensating valve means.

* * * * *